United States Patent [19]

Fournier et al.

[11] Patent Number: 4,637,640
[45] Date of Patent: Jan. 20, 1987

[54] PUSH-IN CONNECT FITTING

[75] Inventors: Paul J. E. Fournier, Jackson; Joseph F. Reinker, Jr., Parma, both of Mich.

[73] Assignee: Aeroquip Corporation, Jackson, Mich.

[21] Appl. No.: 706,442

[22] Filed: Feb. 27, 1985

[51] Int. Cl.⁴ ............................................. F16L 39/00
[52] U.S. Cl. ................................... 285/319; 285/348; 285/351; 285/921
[58] Field of Search ....... 285/319, 348, 351, DIG. 22, 285/314, 315, DIG. 25, 921, 924

[56] References Cited

U.S. PATENT DOCUMENTS

| | | | |
|---|---|---|---|
| 2,954,248 | 9/1960 | Brickman | 285/DIG. 22 |
| 3,933,378 | 1/1976 | Sandford et al. | 285/319 |
| 3,937,547 | 2/1976 | Lee-Kemp | 285/319 |
| 3,997,196 | 12/1976 | Karcher et al. | 285/319 |
| 4,036,515 | 7/1977 | Karcher et al. | 285/319 |
| 4,135,745 | 1/1979 | Dehar | 285/319 |
| 4,423,892 | 1/1984 | Bartholomew | 285/319 |
| 4,541,658 | 9/1985 | Bartholomew | 285/319 |

Primary Examiner—Cornelius J. Husar
Assistant Examiner—Anthony Knight
Attorney, Agent, or Firm—Beaman & Beaman

[57] ABSTRACT

A conduit fitting of the quick connect push-in type wherein a tubular member having a radial shoulder is inserted into an annular body sealingly receiving the tube. A tube retainer employs a plurality of resilient fingers to maintain the tube within the body, while other resilient fingers position and maintain the retainer within the body and a third set of fingers engage and retain a seal in location. The retainer is stamped from flat spring steel stock.

7 Claims, 6 Drawing Figures

PUSH-IN CONNECT FITTING

BACKGROUND OF THE INVENTION

Fluid connections or couplings wherein the male and female components are interconnected merely by axial displacement are sometimes referred to as quick connect push-in connections. Such connections may be very quickly accomplished, and the coupling components may be economically produced. However, connections of this type often do not have acceptable sealing characteristics, and may be subject to leakage due to vibration.

Push-in couplings of the quick connect type are used in the manufacture of motor vehicles wherein during assembly of the vehicle, various conduit systems of the assembled components may be quickly connected merely by inserting one coupling part into the other. An example of this type of coupling is shown in U.S. Pat. No. 3,933,378.

It is an object of the invention to provide a quick connect push-in type fluid coupling wherein the coupling is of economical manufacture and of dependable operation.

A further object of the invention is to provide a push-in coupling having superior sealing characteristics, and where the sealing structure is capable of being quickly assembled within its associated coupling part and is positively maintained in position.

An additional object of the invention is to provide a push-in quick connect fluid coupling utilizing an inexpensive retainer to lock the coupling halves in a connected relationship, the retainer functioning in the dual purpose of retaining the coupling and maintaining the sealing structure within the coupling.

A further object of the invention is to provide a quick connect push-in coupling using a spring steel retainer having fingers defined thereon wherein one set of fingers are used to maintain the retainer within the female coupling body while the other set of fingers maintains the male coupling part in its operable condition.

A further object of the invention is to provide a quick connect push-in type fluid coupling employing a spring steel retainer having three sets of fingers wherein one set of resiliently biased fingers maintains the retainer within the female coupling part, the second set of fingers maintains the male coupling part in its operative condition, and the third set of fingers retains sealing structure within the female coupling component.

In the practice of the invention the tubular female coupling part includes a recess adjacent the connection end for receiving the male coupling half in which is located annular sealing structure and a spring steel retainer. The retainer retains the seal structure within the female part, and simultaneously serves to retain the male coupling part in position during full interconnection.

The male coupling half is in the form of a tube having a cylindrical nose which sealingly engages the coupling seal structure. The tube also includes a radially extending shoulder which slides under the fingers of the retainer during connection and once the shoulder passes the ends of the fingers, the fingers resiliently drop over the shoulder and form abutments preventing withdrawal of the tube.

The retainer is formed of a blank of spring steel sheet that includes three sets of fingers of different length extending from a retainer central base region. Two of the finger sets are deformed from the general "plane" of the retainer, one of the sets of fingers being used to maintain the retainer in the female coupling part by engagement with a shoulder in the female body. A second set of deformed fingers are for the purpose of engaging the tube shoulder to retain the male tube within the female part, and the third set of fingers engage the annular seal structure for retaining the same within the female coupling component.

The use of the spring steel retainer permits a low cost quick connect push-in type coupling to be readily produced, operation of the coupling is positive and the connection is not subject to failure due to vibration. The sealing structure is firmly maintained in the desired position and sealing and holding efficiency between the sealing halves is readily produced.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
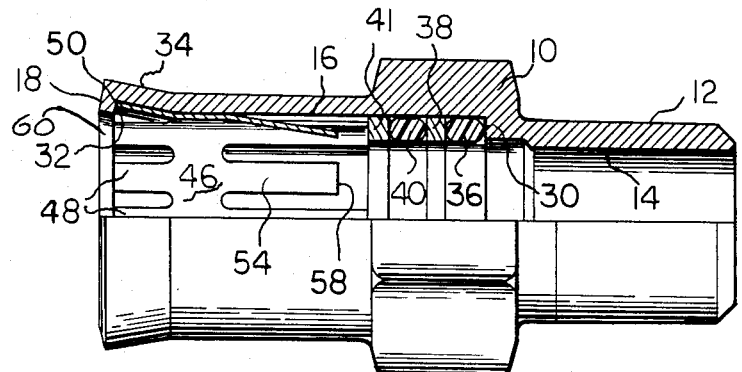
FIG. 1 is an elevational view, partially in section, illustrating the female coupling part in accord with the invention.

The female coupling component 10 is of a tubular configuration and includes a conduit connection end 12 which may be externally threaded, internally threaded or the conduit could be soldered therein, or a flared connection provided. The manner in which the body is connected to an associated conduit constitutes no part of the present invention. An axial passage 14 extends through the body 10.

The other end of the body 10 is open and includes a recess 16 concentric with the body passage. The open connection end 18 is of such diameter as to receive the male half of the coupling which is in the form of a tube 20 having a cylindrical configuration. The tube 20 includes an annular radially outwardly extending shoulder 22 which, in the disclosed embodiment, is formed by outwardly displacing the material of the tube and axially compressing the tube. The tube includes a cylindrical nose 24 located intermediate the open end 26 and the shoulder 22.

The body passage 14 includes a stop shoulder 28 and the recess 16 is internally defined by a right angle shoulder 30. Throughout the majority of its length, the recess 16 is of a cylindrical configuration, and as will be appreciated from FIGS. 1 and 2, adjacent its connection end 18 the body is provided with an annular shoulder 32 transversely disposed to the body axis. The body 10 is flared adjacent the connection end at 34 and this enlarging of the connection end provides sufficient access to the interior of the body to permit ready insertion of the tube 20 therein.

The disclosed sealing structure consists of an elastomer O-ring 36 engaging the recess shoulder 30 engaged by an annular rigid spacer 38 which is in turn engaged by a second elastomer O-ring 40 engaging the annular rigid spacer 41. The internal diameter of the seal assembly is such as to form an effective sealed relationship with the nose 24 of the tube 20 as apparent in FIG. 2.

Figure 3:
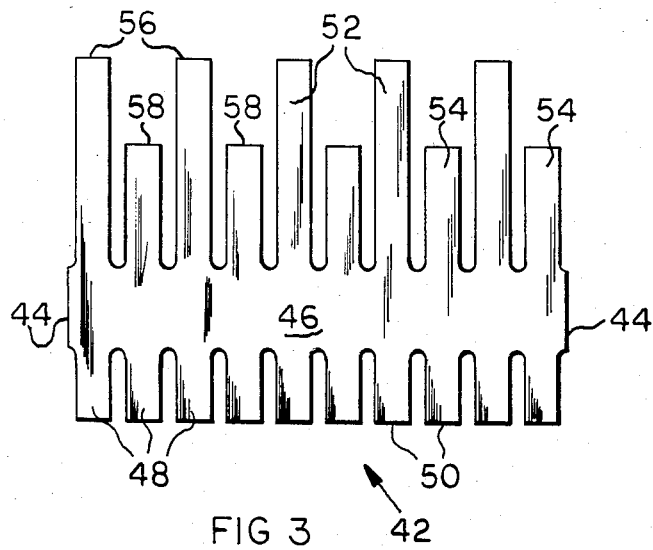
FIG. 3 is a plan view of the retainer blank after stamping and prior to forming into a cylindrical configuration.

The retainer 42 is formed of sheet spring steel, and a flat of spring steel is formed, by stamping, to define a plurality of fingers as apparent in FIG. 3 which illustrates the retainer when in a flat configuration. The retainer is of a width defined by the separation of the end surfaces 44, and the retainer base region is represented at 46. A plurality of evenly spaced fingers extend in a parallel relationship from opposite sides of the base region, and the fingers are each defined by a squared end.

The first set of fingers 48 are short and include ends 50. A second and third set of fingers 54 and 52 extend in an opposite direction, with respect to fingers 48, from the retainer base region 46. The fingers 52 and 54 are alternately arranged on the retainer, the fingers 52 being substantially longer than the fingers 54. The fingers 52 are defined at their termination by squared ends 56 while the fingers 54 include squared ends 58.

Figure 4:
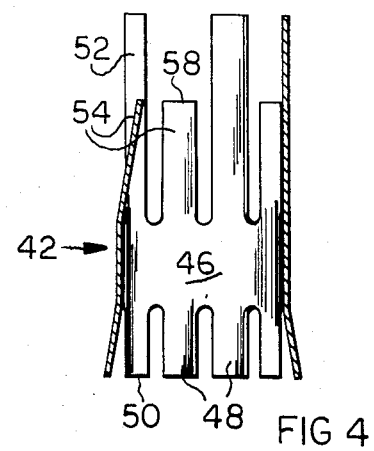
FIG. 4 is a diametrical, elevational, sectional view of the retainer, per se, upon being formed in a tubular configuration and prior to insertion into the female coupling part.
Figure 5:
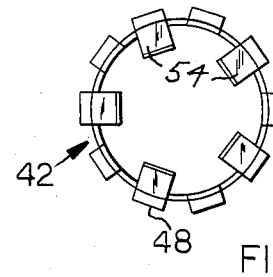
FIG. 5 is an end view of the tubular retainer as taken from the top of FIG. 4.
Figure 6:
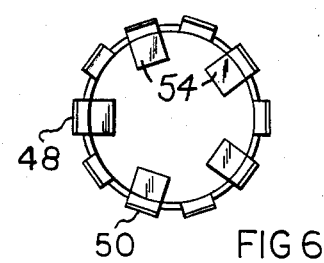
FIG. 6 is a bottom end view of the retainer of FIG. 4.

After forming as shown in FIG. 3, the fingers 48 are deformed from the plane of the retainer sheet in a direction toward the viewer, while the fingers 54 are deformed from the plane of the retainer sheet in the opposite direction, away from the viewer. Thus, when the retainer 42 is "rolled" into a tubular configuration as shown in FIGS. 4-6, the fingers 48 will be deformed "outwardly" with respect to the axis of the retainer configuration, while the fingers 54 are deformed "inwardly".

During assembly, the sealing structure 36-41 will be placed within the recess 16 of body 10 as apparent in FIG. 1. Thereupon, the tubular retainer 42 is inserted into the body through the connection end 18 with the fingers 52 foremost. The retainer is axially inserted into the recess until the finger ends 56 engage the seal spacer 41 and as the retainer is being inserted the body opening 60 at end 18 will be bending the fingers 48 inwardly as the fingers are being pushed over the opening edge.

Figure 2:
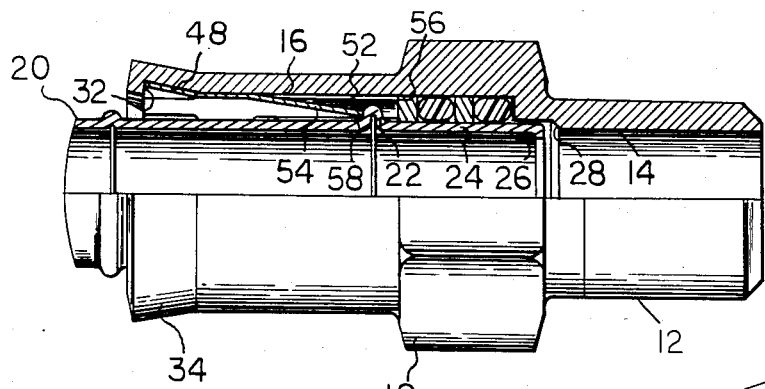
FIG. 2 is an elevational view, partially sectioned, similar to FIG. 1 and illustrating the male coupling part in a fully connected relationship.

The length of the retainer 42 is predetermined such that when the fingers ends 56 engage, and slightly compress the sealing structure, the fingers ends 50 "snap over" the recess shoulder 32 and engage the shoulder 32 as shown in FIGS. 1 and 2 which positively axially positions the retainer within the body, and simultaneously fixes the axial position of the sealing structure. Of course, it will also be appreciated that due to the resilient character of the spring steel retainer the retainer has a tendency to radially "expand" against the recess 16, further insuring a positive relationship of the retainer with respect to the body 10.

The retainer relationship will now be as illustrated in FIG. 1, and as will be noted, the fingers 54 extend inwardly toward the axis of the body 10. Upon insertion of the tube 20 into the connection end 18 of the body, the nose 24 will pass under the fingers 54, and the shoulder 22 will engage the fingers and bias the same radially outwardly as the shoulder passes under the fingers. Upon the tube end 26 substantially engaging the body stop 28 the ends 58 of the fingers 54 will "snap over" the shoulder 22 and the ends thereof will engage the shoulder as shown in FIG. 2. So related, the tube 20 is fixed within the body 10 and cannot be axially withdrawn from the body due to the engagement of the finger ends 50 with the recess shoulder 32.

The assembly will now be as illustrated in FIG. 2 wherein the tube 20 is axially fixed within the body 10 and a fluid-tight relationship between the body and tube exists.

If it is desired to remove the tube 20 from the body 10 a tubular tool, not shown, is inserted over the tube and within the opening 60 and moved toward the shoulder 22 wherein the tool will bias the fingers 54 outwardly and once the ends have cleared the shoulder 22 the tube may be withdrawn from the body.

Couplings of the aforedescribed type are readily adaptable for quick connect installations wherein effective long connections of a relatively permanent type are desired, for instance in the assembly of vehicle hose connections. The components of the coupling may be economically manufactured, positive sealing is economically produced, and the spring steel retainer is economical to fabricate, easily assembled into the body and positive in its operation, and not subject to inadvertent release due to vibration.

It is appreciated that various modifications to the inventive concepts may be apparent to those skilled in the art without departing from the spirit and scope thereof.

We claim:

1. A conduit system fitting characterized by its ease and simplicity of connection comprising, in combination, a first body having an axial passage, a conduit attachment end and a connection end, a recess defined in said body concentric with said passage intersecting said connection end adapted to receive an elongated tube having an end and an external shoulder axially spaced from said tube end, a shoulder defined in said recess adjacent said connection end, a stop defined in said passage engagable with said tube for limiting insertion of said tube within said passage, an annular sheet metal tube retainer fixed within said recess, said retainer being of an annular configuration having a central region, an inner end region and an outer end region, a plurality of cantilevered second resilient fingers each having free ends and located at said retainer inner end region longitudinally extending toward said stop and resiliently inwardly biased wherein the finger ends engage the tube shoulder upon the tube being fully inserted into the recess and a plurality of cantilevered first resilient elongated fingers separate and distinct from said second fingers each having free ends and located at said retainer outer end region extending toward said body connection end and resiliently biased outwardly whereby said first finger ends engage said recess shoulder adjacent said connection end maintaining said retainer within said recess.

2. In a conduit system fitting as in claim 1, said retainer being formed by a spring steel.

3. In a conduit system fitting as in claim 1, said first and second fingers each comprising an elongated element having substantially parallel side edges and an end substantially perpendicular to the associated side edges.

4. In a conduit system fitting as in claim 3, said retainer being formed of a flat sheet blank shaped into an annular configuration prior to being located within said body recess.

5. A conduit system fitting characterized by its ease and simplicity of connection comprising, in combination, a first body having an axial passage, a conduit attachment end and a connection end, a recess defined in said body concentric with said passage intersecting said connection end adapted to receive an elongated tube having an end and an external shoulder axially spaced from said tube end, a shoulder defined in said recess adjacent said connection end, a stop defined in said passage engagable with said tube end for limiting insertion of said tube within said passage, an annular sheet metal tube retainer fixed within said recess, said retainer comprising a plurality of second resilient fingers longitudinally extending toward said stop and resiliently inwardly biased wherein the finger ends engage the tube shoulder upon the tube being fully inserted into the recess and a plurality of first resilient elongated fingers extending toward said body connection end and resiliently biased outwardly whereby said first finger ends engage said recess shoulder adjacent said connection end maintaining said retainer within said recess, annular seal means within said recess for sealing said tube relative to said body, a plurality of third resilient fingers defined on said retainer extending in the direction of said stop having ends extending beyond said second finger ends and engaging said seal means to retain said seal means within said recess.

6. In a conduit system fitting as in claim 5, a second shoulder defined in said recess, said seal means engaging said second shoulder defined in said recess, said third fingers maintaining said seal means in engagement with said second shoulder.

7. In a conduit system fitting as in claim 5, said retainer being of an annular configuration having a central region, an inner end region, and an outer end region, said third fingers being circumferentially spaced from each other between said second fingers, said second and third fingers comprising said inner end region, and said first fingers comprising said outer end region.

* * * * *